Patented Jan. 18, 1949

2,459,338

UNITED STATES PATENT OFFICE 2,459,338

AMINO METHYL PHENOLS

Albert L. Rawlins, Grosse Pointe Woods, Walter F. Holcomb, Detroit, Eldon M. Jones, Grosse Pointe Woods, Frank H. Tendick, Grosse Pointe Park, and Joseph H. Burckhalter, Detroit, Mich., assignors to Parke, Davis & Company, Detroit, Mich., a corporation of Michigan No Drawing. Application April 22, 1944, Serial No. 532,372

7 Claims. (Cl. 260—570.9)

The invention relates to new benzene ring alkylated phenyl phenols containing at least one aminomethyl group attached directly to a benzene ring to which a phenolic hydroxyl and an alkyl radical are also attached. The invention also relates to process for obtaining these new products.

The compounds of the invention have the general formula,

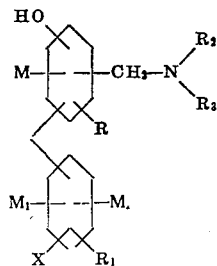

where M, M$_1$ and M$_2$ are members of the class hydrogen and

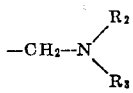

where R is alkyl or alkylene, R$_1$ is a member of the class hydrogen, halogen alkyl and alkylene, R$_2$ is hydrogen, an alkyl radical, an alkylene radical, or hydroxyalkyl containing not more than 6 carbon atoms, R$_3$ is an alkyl radical, an alkylene radical or hydroxyalkyl containing not more than 6 carbon atoms and X is a member of the class hydrogen, halogen and hydroxyl.

The compounds can be prepared by several methods, such as the following:

A. An alkyl phenylphenol can be treated with formaldehyde and an amine to cause a transformation which may be represented by the equation:

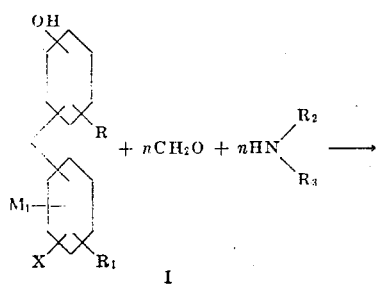

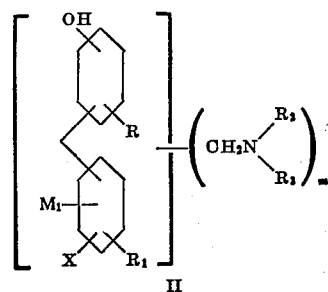

where R, R$_1$, R$_2$, R$_3$, M$_1$, and X have the values already given under the general formula, and where $n$ is one of the integers 1, 2, 3, or 4 and $m$ is 1, 2, 3, or 4.

A variation of this procedure is to cause the formaldehyde and the secondary amine to react in a suitable solvent to form a dialkylaminomethanol or a dialkylaminomethyl alkyl ether. These intermediate products may or may not be isolated prior to reaction with the alkyl substituted phenols represented by Formula I.

B. An alkyl phenol, such as described by Formula I, may be treated with formaldehyde in the presence of an alkaline catalyst, e. g., sodium hydroxide or potassium carbonate, to yield a methylol compound which may subsequently be treated with a strongly basic primary or secondary amine in the presence of acid to give a substituted aminomethylphenol represented by Formula II. A variation of this process involves the treatment of the intermediate methylol compound in acetic acid with gaseous hydrogen chloride. The intermediate chloromethyl derivative is then isolated and caused to react with a suitable amine.

C. The carbethoxy ester of an alkyl phenol, such as described by Formula I, may be chloromethylated by the procedure of Compt. rend., 197, 256 (1933). This chloromethyl derivative is then treated with an alcoholic solution of a primary or secondary amine and the intermediate thus formed hydrolyzed by refluxing with dilute alkali solution to give compounds represented by Formula II.

These new compounds are useful therapeutic agents, being characterized by their toxicity to bacteria and protozoa. In particular, they are effective antimalarials and may be used in the form of their free bases or as salts of mineral acids, such as hydrochloric, hydrobromic, sulfuric, phosphoric, sulfamic, or as salts of organic acids, such as acetic, propionic, lactic, citric, benzoic, etc.

3

These substances are also antioxidants and as such are useful as inhibitors.

In order to illustrate this invention, the following examples are given, but they are not intended as limitations with respect to the phenols or the amines used or with respect to the conditions for reaction.

Example I

Preparation of 5,5'-Diallyl-3,3'-bis-(diethylaminomethyl)-4,4'-biphenol dihydrochloride.

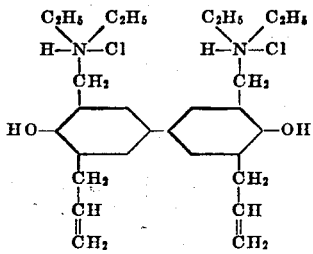

Paraformaldehyde (7.5 grams) (0.25 mole) and 18.3 grams (0.25 mole) of diethylamine are mixed in 25 cc. of alcohol and warmed until a clear solution is obtained. The solution is cooled and mixed with 26.6 grams (0.10 mole) of 3,3'-diallyl-4,4'-biphenol in 25 cc. of alcohol. After standing several hours, the solution is warmed for one hour on the steam bath, allowing the alcohol to boil off. The residue is then taken up in ether and water, the ether layer separated and washed with 2% sodium hydroxide solution and finally with water. The washed ether solution is dried over solid potassium carbonate, and filtered. After acidifying with alcoholic hydrogen chloride, the ether is distilled off and the alcoholic residue diluted with an equal volume of acetone. The crystalline hydrochloride is filtered off, triturated with alcohol, diluted with several volumes of acetone, filtered and dried; M. P. 209–210° C.

By a similar procedure using either paraformaldehyde or aqueous formaldehyde and other amines, such as dimethylamine, dipropylamine, dibutylamine, dihydroxyethylamine, ethylamine, hydroxyethylamine, etc., the corresponding derivatives of 3,3' diallyl-4,4'-biphenol are obtained. The names and melting points of some of these compounds follows:

5,5' - diallyl-3,3'-bis(dimethylaminomethyl)-4,4'-biphenol dihydrochloride; M. P. 240° C.
5,5' - diallyl - 3,3'-bis(di-n-propylaminomethyl)-4,4'-biphenol dihydrochloride; M. P. 185–187° C.
5,5' - diallyl - 3,3' - bis(di - n-butylaminomethyl)-4,4'-biphenol dihydrochloride; M. P. 177–178° C.
5,5' - diallyl - 3,3' - bis(di - β-hydroxyethylaminomethyl)-4,4'-biphenol; M. P. 130° C.
5,5' - diallyl - 3,3'-bis(β-hydroxyethylaminomethyl)-4,4'-biphenol; M. P. 107–109° C.

By using 3,3'-dimethallyl-4,4'-biphenol or 3,3'-dichloroallyl-4,4'-biphenol and the appropriate amine, analogs of the above compounds may be obtained; e. g., 5,5' - dimethallyl - 3,3'-bis(diethylaminomethyl)-4,4'-biphenol dihydrochloride; M. P. 264–265° C.
5,5'-dimethallyl-3,3'-bis(dimethylaminomethyl)-4,4'-biphenol dihydrochloride; M. P. 160° C.
5,5' - di-β-chloroallyl-3,3'-bis(diethylaminomethyl)-4,4'-biphenol dihydrochloride; M. P. 208° C.

4

Example II

Preparation of 3,3'-dimethyl-5,5'-bis-(diethylaminomethyl)-4,4'-biphenol dihydrochloride.

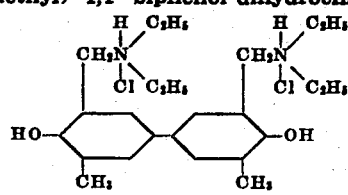

Paraformaldehyde (3.6 grams) (0.12 mole) and 8.7 grams of diethylamine (0.12 mole) are mixed with 10 cc. of alcohol and warmed with stirring until a clear solution is obtained. After cooling, this solution is added to a solution of 10.7 grams (0.05 mole) of 3,3'-dimethyl-4,4'-biphenol in 10 cc. of alcohol and heated on the steam bath for two hours. Part of the alcohol is then evaporated, the residue is taken up in ether and washed with 2.5% sodium hydroxide solution and then with saturated sodium chloride. The washed ether solution is dried over potassium carbonate acidified with alcoholic HCl, and distilled to near dryness under reduced pressure. After extracting the residue several times with ether, it is crystallized from a mixture of alcohol and ether. The product is charcoaled and recrystallized from a mixture of methanol and acetone; M. P. 213–215° C.

By a similar procedure using either paraformaldehyde or aqeous formaldehyde, an appropriate amine, and other biphenols which are disubstituted by alkyls such as ethyl, propyl, butyl, hexyl, etc., the corresponding analogs of 3,3'-dimethyl 5,5'-bis-(diethylaminomethyl)-4,4'-biphenol may be obtained; e. g., 3,3'-di-n-propyl-5,5'-bis-(diethylaminomethyl) - 4,4' - biphenol dihydrochloride; M. P. 223–224° C.

Example III

Preparation of 3,3'-diallyl - 5,5'-bis - (diethylaminomethyl)-2,2'-biphenol dihydrochloride.

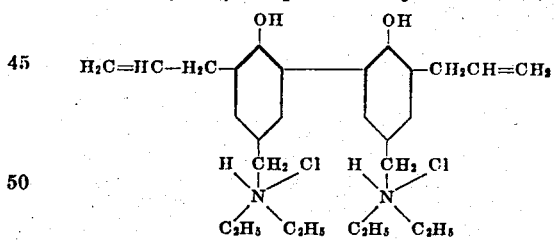

3,3'-diallyl-2,2'-biphenol (26.6 grams) (0.10 mole) is dissolved in alcohol and treated with 3.0 grams (0.10 mole) of paraformaldehyde and 7.3 grams (0.10 mole) of diethylamine. The mixture is warmed on the steam bath for two hours then worked up in the same manner as outlined in Example I. The desired product, which is obtained in the form of the white crystalline dihydrochloride, may be recrystallized from ethanol, isopropanol, or acetone.

What we claim as our invention is:

1. The compound represented by the following formula:

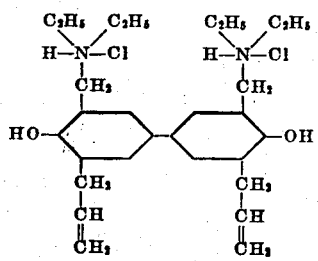

2. A compound of the class consisting of a free base and its acid addition salts, said free base having the formula,

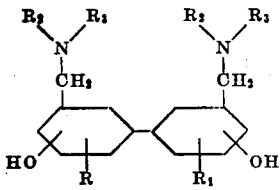

where R is a member of the class consisting of alkyl and alkenyl, $R_1$ is a member of the class consisting of alkyl, and alkenyl, and $R_2$ and $R_3$ are alkyl containing not more than 6 carbon atoms.

3. An acid addition salt of a compound of the formula:

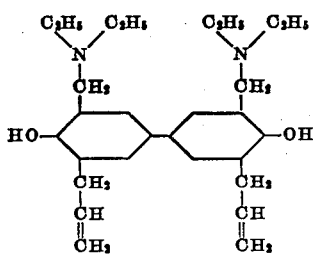

4. An acid addition salt of a compound of the formula:

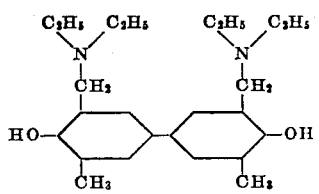

5. The hydrochloride salt of a compound of the formula:

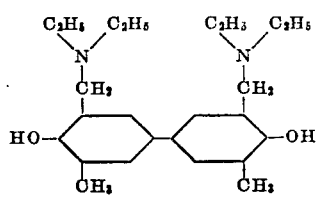

6. An acid addition salt of a compound of the formula:

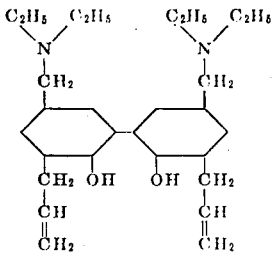

7. The hydrochloride salt of a compound having the formula:

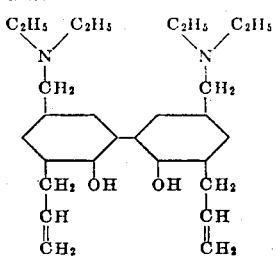

ALBERT L. RAWLINS.
WALTER F. HOLCOMB.
ELDON M. JONES.
FRANK H. TENDICK.
JOSEPH H. BURCKHALTER.

REFERENCES CITED

The following references are of record in the file of this patent:

UNITED STATES PATENTS

| Number | Name | Date |
|---|---|---|
| 2,031,557 | Bruson | Feb. 18, 1936 |
| 2,033,092 | Bruson | Mar. 3, 1936 |
| 2,045,517 | Bruson et al. | June 23, 1936 |
| 2,063,151 | Dahlen | Dec. 8, 1936 |
| 2,082,306 | Sutter | June 1, 1937 |
| 2,114,122 | Bruson | Apr. 12, 1938 |
| 2,220,835 | Bruson | Nov. 5, 1940 |
| 2,218,739 | Bruson | Oct. 22, 1940 |
| 2,260,967 | Bruson | Oct. 28, 1941 |
| 2,363,134 | McCleary | Nov. 21, 1944 |